US012670712B2

(12) United States Patent
Leyton et al.

(10) Patent No.: US 12,670,712 B2
(45) Date of Patent: Jun. 30, 2026

(54) METHOD FOR DETECTING DISPLAY SCREEN BOUNDARIES

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 292 days.

(21) Appl. No.: 18/344,328

(22) Filed: Jun. 29, 2023

(65) Prior Publication Data

US 2024/0005658 A1      Jan. 4, 2024

(30) Foreign Application Priority Data

Jun. 30, 2022    (GB) ...................................... 2209623

(51) Int. Cl.
*G06V 20/20*          (2022.01)
*G06T 7/73*           (2017.01)
                      (Continued)

(52) U.S. Cl.
CPC ................ *G06V 20/20* (2022.01); *G06T 7/73* (2017.01); *G06V 10/44* (2022.01); *G06V 20/40* (2022.01)

(58) Field of Classification Search
CPC ........ G06V 20/20; G06V 10/44; G06V 20/40; G06T 7/73
See application file for complete search history.

(56) References Cited

U.S. PATENT DOCUMENTS 10,645,298 B2 * 5/2020 Laurent ................ H04N 23/695
11,175,791 B1 * 11/2021 Patnaikuni .............. G06F 3/017
(Continued)

FOREIGN PATENT DOCUMENTS

EP          3236415 A1    10/2017
WO     WO-2019108211 A1 *  6/2019 ............. G06F 3/147

OTHER PUBLICATIONS

Combined Search and Examination Report issued Dec. 14, 2023, from the UK Intellectual Property Office for GB patent application No. 2209623.4.

(Continued)

*Primary Examiner* — Utpal D Shah
*Assistant Examiner* — Jack Peter Kraynak
(74) *Attorney, Agent, or Firm* — Kilpatrick Townsend & Stockton LLP

(57) ABSTRACT

A computer-implemented method for detecting a display screen using an extended reality display device, comprising receiving, at the extended reality display device, an image, or data defining an image, corresponding to a predetermined frame of a video stream, the predetermined frame comprising a plurality of specified feature points, monitoring a display screen that is displaying the video stream, detecting at least some of the plurality of specified feature points in the predetermined frame of the video stream as displayed on the display screen, and determining, based on the detected specified feature points, the physical boundaries of the display screen.

16 Claims, 6 Drawing Sheets

(51) Int. Cl.
　　*G06V 10/44*　　　(2022.01)
　　*G06V 20/40*　　　(2022.01)

(56)　　　　　　　References Cited

U.S. PATENT DOCUMENTS

| | | | | |
|---|---|---|---|---|
| 2014/0003653 A1* | 1/2014 | Walker | ................... | G06F 3/147 |
| | | | | 382/103 |
| 2015/0049012 A1* | 2/2015 | Liu | ......................... | G06F 3/016 |
| | | | | 345/156 |
| 2017/0300769 A1* | 10/2017 | Vandeweerd | ......... | H04N 23/69 |
| 2020/0241733 A1* | 7/2020 | Drake | .................... | A63F 13/25 |
| 2022/0012920 A1* | 1/2022 | Beith | ................... | G06F 3/1454 |

OTHER PUBLICATIONS

Extended Search Report issued Oct. 10, 2023, from the EP Patent Office for corresponding EP patent application No. 23182226.3.
EP23182226.3, "Office Action", Oct. 1, 2025, 7 pages.

* cited by examiner

METHOD FOR DETECTING DISPLAY SCREEN BOUNDARIES

CROSS-REFERENCE TO RELATED APPLICATIONS

The present application claims priority from British Patent Application No. 2209623.4, filed 2022 Jun. 30, the contents of which are incorporated herein by reference in its entirety.

FIELD

The present specification relates to a computer-implemented method for detecting the boundaries of a display screen using an extended reality display device.

BACKGROUND

Extended reality includes all real and virtual combined environments and also completely virtual environments. The term extended reality encompasses mixed-reality, augmented reality and virtual reality.

In mixed-reality, the real world and the virtual world work together to create an augmented reality (or mixed-reality) environment. Images are displayed virtually, which may overlap or coincide with the real-world. This can include, for example, displaying virtual objects (e.g. three dimensional interactive images) on tabletops, walls, chairs and floors of the real-world environment.

It is often desirable to know the physical location and boundaries of real objects in a mixed or extended reality environment, as this can allow virtual content to be displayed at a desired location relative to a real-world object.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a computer-implemented method for detecting a display screen using an extended reality display device, comprising: receiving, at the extended reality display device, an image corresponding to a predetermined frame of a video stream, the predetermined frame comprising a plurality of specified feature points; monitoring a display screen that is displaying the video stream; detecting at least some of the plurality of specified feature points in the predetermined frame of the video stream as displayed on the display screen; and determining, based on the detected plurality of specified feature points, the physical boundaries of the display screen.

Thus, the extended reality display device receives a single frame of a video output as an image to allow the extended reality display device to detect the physical boundaries of the display screen. In some embodiments the extended reality display device may receive data defining the single frame of a video output, rather than an image.

The present disclosure does not require computer vision, artificial intelligence or machine learning to accurately and reliably detect the screen, as is often required in the prior art. As such, the present disclosure can reduce computational cost and complexity compared to the prior art.

In addition, the method of the present disclosure may not require a QR code (or similar image) to be displayed on the display screen, as a frame from the video output is used instead. Thus, the present disclosure may not require a video stream to be interrupted or delayed in order to carry out a set up procedure in which the extended reality display device determines the physical boundaries of the display screen.

It will be appreciated that the display screen is not limited to an electronic display such as a monitor or a TV. In some embodiments, the display screen may be a surface such as a wall or sheet of material that is being used as a projector screen.

The term extended reality may be abbreviated to XR in this disclosure.

Optionally, the extended reality display device may be a mixed reality (MR) display device.

Optionally, the extended reality display device may be an augmented reality (AR) display device, such as an AR headset.

Optionally, each feature point may be a virtual object.

Optionally, the method includes receiving, at the extended reality display device, data from a game data stream associated with the video stream.

The method may include determining, based on the detected specified feature points and the data received, the physical boundaries of the display screen. Optionally, the game data received may provide additional specified image points to be detected in the predetermined frame.

In some embodiments, the method may include using the data received from the game data stream to determine the orientation of the display screen.

The method may include probing the game data stream to retrieve data.

Optionally, the method includes analysing or processing the data received or retrieved from the game data stream.

Optionally, the method further comprises determining, based on the detected plurality of specified feature points, or based on the detected plurality of specified feature points and the received data, at least one of the orientation, position, size and location of the display screen.

The step of monitoring the display screen may comprise using image tracking and detection to look for the plurality of specified feature points on the display screen. Optionally, the method may use AR image tracking and detection.

It will be appreciated that detecting at least some of the plurality of specified feature points may comprise detecting all of the specified feature points. Optionally, only a portion of the specified feature points may be detected.

Optionally, the method further comprises receiving, at the extended reality display device, information comprising a location of each specified feature point relative to at least one physical boundary of the display screen.

Optionally, the method further comprises determining, from the image, a location of each specified feature point relative to at least one physical boundary of the display screen.

Optionally, determining, based on the detected specified feature points, the physical boundaries of the display screen, comprises comparing the detected plurality of specified feature points to the image corresponding to the predetermined frame of the video stream.

Optionally, in response to the extended reality display device failing to detect a sufficient number of the specified feature points in the predetermined frame to enable the physical boundaries of the display screen to be determined, the method may comprise outputting a notification from the extended reality display device. The notification may be displayed on the display screen.

Optionally, the method further comprises receiving, at the extended reality display device, a plurality of images, each image corresponding to one of a plurality of predetermined frames of the video stream, each predetermined frame comprising a respective plurality of specified feature points. In some embodiments, the plurality of images may be received periodically.

Optionally, in response to the extended reality display device failing to detect a sufficient number of the specified feature points in a first one of the plurality of predetermined frames to enable the physical boundaries of the display screen to be determined, the method may comprise receiving a second image corresponding to a second predetermined frame of the video stream. In some embodiments, the second image may only be received in response to a failure to determine the display screen boundaries using the first image and the first predetermined frame.

Optionally, the method further comprises detecting at least some of the plurality of specified feature points in the second predetermined frame of the video stream as displayed on the display screen. Thus, the second predetermined frame may be identified based on the detection of at least some of the plurality of specified feature points on the display screen as shown in the second image.

Optionally, the method further comprises determining, based on the detected specified feature points of the second predetermined frame, the physical boundaries of the display screen. This may include determining the position, orientation and size of the display screen.

Optionally, in response to the extended reality display device failing to determine the physical boundaries of the display screen, the method may comprise receiving at the extended reality display device a test image, the test image comprising a plurality of specified feature points. Thus, the test image may be a default option in the event of failure to detect one or more predetermined frames in the video stream. Preferably, the test image (or the plurality of specified feature points in the test image) are easier for the extended reality display device to detect relative to the one or more predetermined frames, or there may be more specified feature points in the test image compared to the one or more predetermined frames.

Optionally, the method further comprises detecting at least some of the plurality of specified feature points in the test image as displayed on the display screen.

Optionally, the method further comprises determining, based on the detected plurality of specified feature points in the test image, the physical boundaries of the display screen.

Optionally, the test image may be a frame in the video stream.

Optionally, the video stream is a video game or a computer game. In some embodiments, the test image may be a frame from a cut scene in the video game or computer game.

Optionally, the display screen and the extended reality display device are in communication via a communication network. Optionally, the display screen and the extended reality display device are in communication with a computing device via a communication network. The computing device may be configured to provide the video stream to the display screen and/or to provide the image(s) of the at least one predetermined frame to the extended reality display device.

Optionally, the computing device may be a video game console, or a PC.

Optionally, the display screen may be a TV, or an electronic display screen, or a computer monitor.

Optionally, the extended reality display device may be in communication with a plurality of electronic devices via a communication network. The plurality of electronic devices may include one or more additional extended reality display devices.

Optionally, the method further comprises providing the determined physical boundaries of the display screen to one or more of the electronic devices via the communication network. This sharing of information may improve efficiency and avoid the need for one or more of the other electronic devices to have to carry out similar or alternative methods to determine the same display screen boundaries.

Optionally, the method may further comprise the initial step of communicating with the plurality of electronic devices to determine if the physical boundaries of the display screen are known by any of the plurality of electronic devices.

In response to determining that the physical boundaries of the display screen are not known by any of the plurality of electronic devices, the method may continue according to any of the preceding examples or embodiments of this disclosure.

After the physical boundaries have been determined (e.g., the location, size and orientation of the physical boundaries of the display screen), the method may include creating or generating one or more virtual boundaries aligned with or overlapping with the physical boundaries of the display screen. The virtual boundaries are therefore a virtual representation of the physical boundaries of the display screen within a virtual environment created by an extended reality display device.

The virtual boundaries may be fixed or anchored with respect to the physical boundaries of the display screen, such that the virtual boundaries will not move even if the user or the extended reality display device moves.

The virtual boundaries may define where virtual objects can be displayed without overlapping with the display screen. Optionally, the virtual boundaries define the boundaries of a virtual display area within which virtual content may be presented. The virtual display area may surround the display screen.

According to a second aspect of the present disclosure, there is provided an extended reality display device comprising a processor and memory, the memory including executable instructions that, as a result of execution by the processor, causes the extended reality display device to perform the computer-implemented method of any embodiment or example of the first aspect of the disclosure.

Optionally, the extended reality display device may be a mixed reality (MR) display device.

Optionally, the extended reality display device is an augmented reality (AR) headset.

According to a third aspect of the present disclosure, there is provided a system comprising a display screen, a computing device and an extended reality display device, wherein the display screen, the computing device and the extended reality display device are operably connected by a communication network, the extended reality display device comprising a processor and memory, the memory including executable instructions that, as a result of execution by the processor, causes the extended reality display device to perform the computer-implemented method of any embodiment or example of the first aspect of the disclosure.

Optionally, the extended reality display device may be a mixed reality (MR) display device. Optionally, the extended reality display device is an augmented reality (AR) headset.

Optionally, the computing device may be a video game console.

Optionally, the display screen may be a TV, or an electronic display screen, or a computer monitor.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
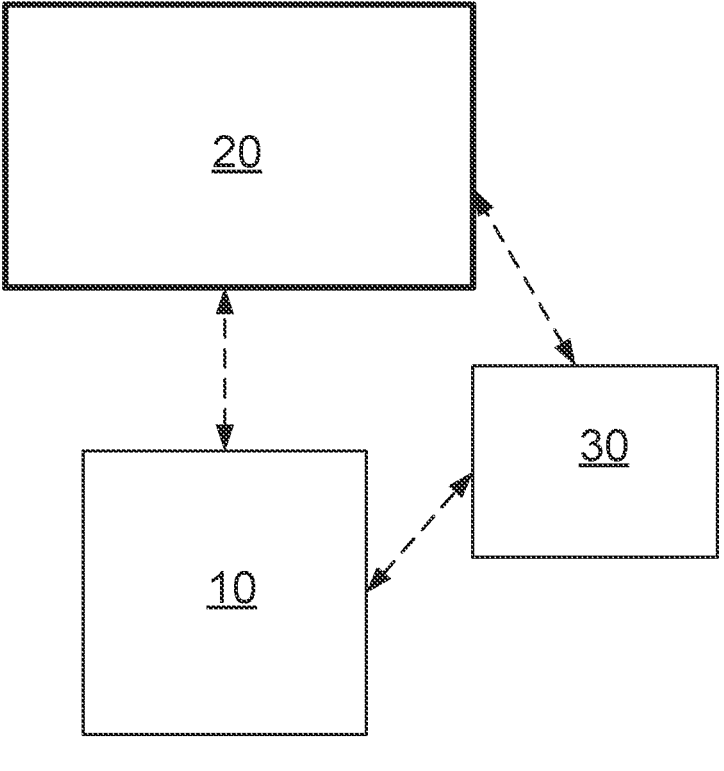
FIG. 1 shows a block diagram representing a system according to an embodiment of the present disclosure.

FIG. 1 shows a simplified block diagram of a system according to an embodiment of the present disclosure. As shown, the system comprises an extended reality display device 10, a display screen 20 and a computing device 30. The extended reality display device 10, a display screen 20 and a computing device 30 are all operably connected via a communication network, as represented by the dotted lines in FIG. 1. In some embodiments, information can be exchanged two-ways between each component in the system. The computing device 30 and the display screen 20 may be integral, for example the computing device 30 may be a smart TV comprising a display screen 20. Optionally, the computing device 30 may be referred to as a client device.

Figure 2:
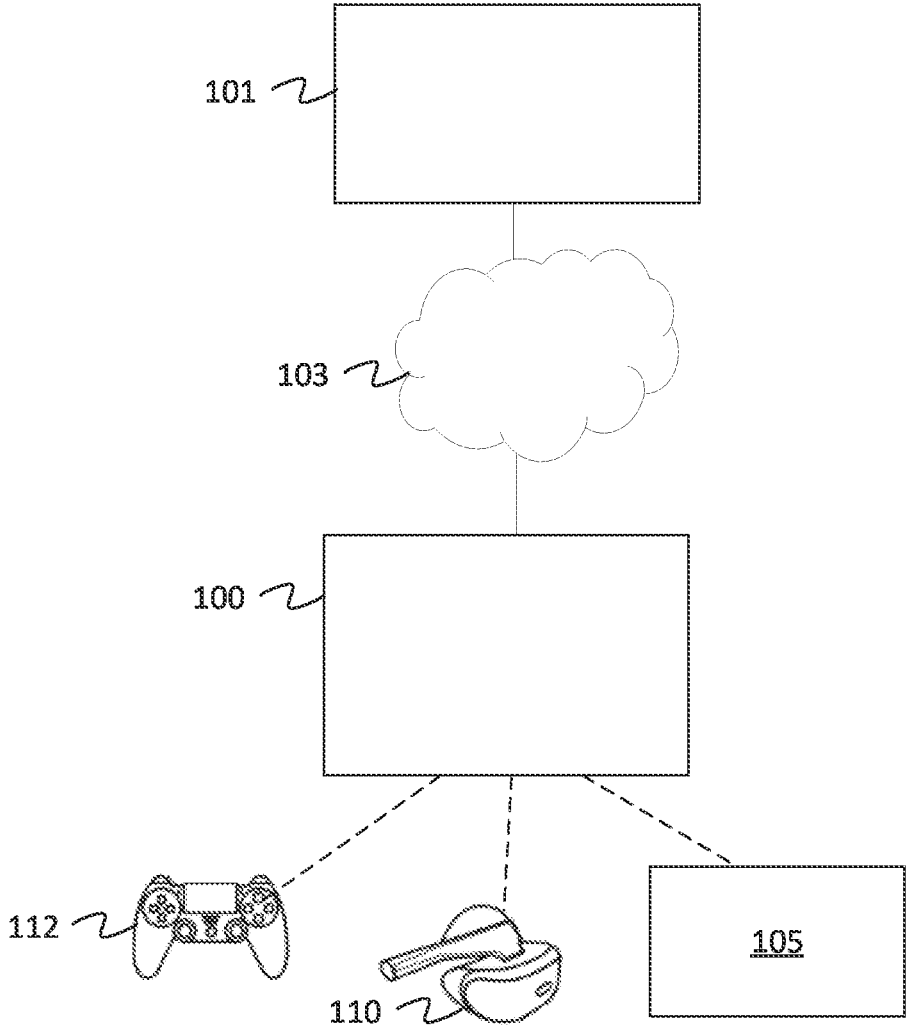
FIG. 2 shows an embodiment of a cloud gaming system according to an embodiment of this disclosure.

FIG. 2 shows schematically a cloud gaming system in accordance with an embodiment of the present disclosure. In FIG. 2, the cloud gaming system is shown as comprising a server 101 that is in communication with a client device 100 via a communications network 103.

In other embodiments, the system may not comprise the server 101 or the communication network 103. Instead, the client device 100 may comprise memory storing the information (such as the virtual environment) to be displayed on the display screen 105. Alternatively, the client device 100 may receive a non-transitory computer readable memory comprising the information (such as the virtual environment) to be displayed on the display screen 105.

The client device 100 may include, but is not limited to, a video game playing device (games console), a smart TV, a set-top box, a smartphone, laptop, personal computer (PC), USB-streaming device, etc. The client device 100 is configured to receive video frames and data from the server 101, via the communications network 103.

The client device 100 comprises a display screen 105 having physical boundaries. The display screen 105 may be in communication with the client device via a wired or wireless connection.

The client device 100 is also in communication with an extended reality display device 110. In FIG. 2, the extended reality display device is shown as a PS VR® headset, but this is not limiting, as it will be appreciated that other types of XR, VR, MR or AR headsets may be used.

In FIG. 2, the client device 100 is also shown as being associated with an input device 112 (DualShock 4®). It will be appreciated that a plurality of input devices and/or a plurality of extended reality display devices 110 or other electronic devices may be in communication with the client device 100 and/or the extended reality display device 110. The input device shown is merely an illustrative example and a different number of, and/or different types of input devices may be provided. The input device may be in communication with the client device 100 via a wired or wireless connection.

Figure 3:
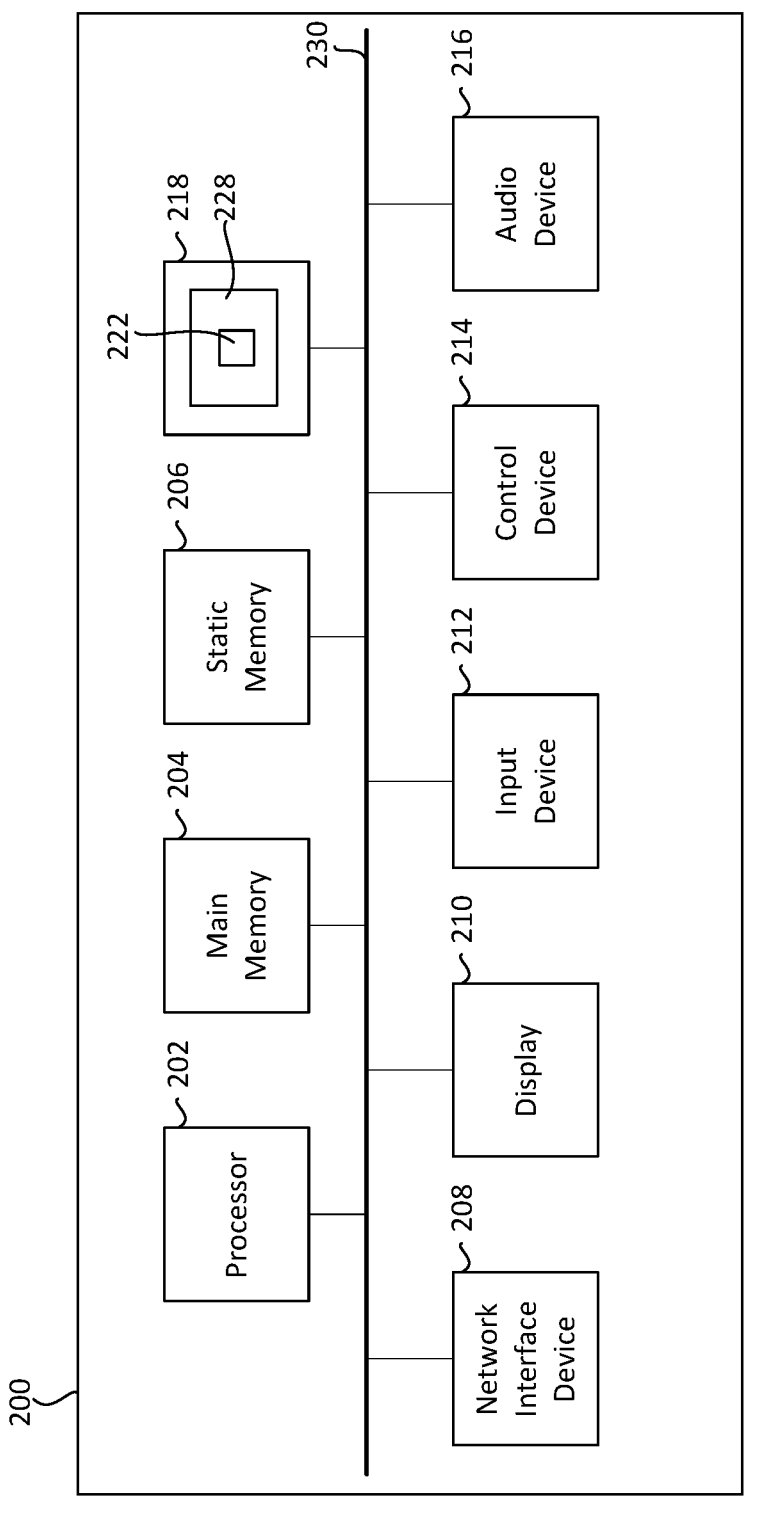
FIG. 3 shows a block diagram representing a computing device or an extended reality display device according to an embodiment of this disclosure.

FIG. 3 is a block diagram of one example implementation of a computing device or extended reality display device 200 such as but not limited to an AR/VR headset according to an embodiment of the present disclosure. The computing device is associated with executable instructions for causing the computing device to perform any one or more of the methodologies discussed herein. The computing device 200 may operate in the capacity of the data model or one or more computing resources for implementing the data model for carrying out the methods of the present disclosure. In alternative implementations, the computing device 200 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 200 includes a processing device 202, a main memory 204 (e.g., read-only memory (ROM), flash memory, dynamic random-access memory (DRAM) such as synchronous DRAM (SDRAM) or Rambus DRAM (RDRAM), etc.), a static memory 206 (e.g., flash memory, static random-access memory (SRAM), etc.), and a secondary memory (e.g., a data storage device 218), which communicate with each other via a bus 230.

Processing device 202 represents one or more general-purpose processors such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 is configured to execute the processing logic (instructions 222) for performing the operations and steps discussed herein.

The computing device 200 may further include a network interface device 208. The computing device 200 also may include a video display unit 210 (e.g., a liquid crystal display (LCD) or a cathode ray tube (CRT)), an alphanumeric input device 712 (e.g., a keyboard or touchscreen), a cursor control device 214 (e.g., a mouse or touchscreen), and an audio device 216 (e.g., a speaker).

The data storage device 218 may include one or more machine-readable storage media (or more specifically one or more non-transitory computer-readable storage media) 228 on which is stored one or more sets of instructions 222 embodying any one or more of the methodologies or functions described herein. The instructions 222 may also reside, completely or at least partially, within the main memory 204 and/or within the processing device 202 during execution thereof by the computer system 200, the main memory 204 and the processing device 202 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilising terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 4:
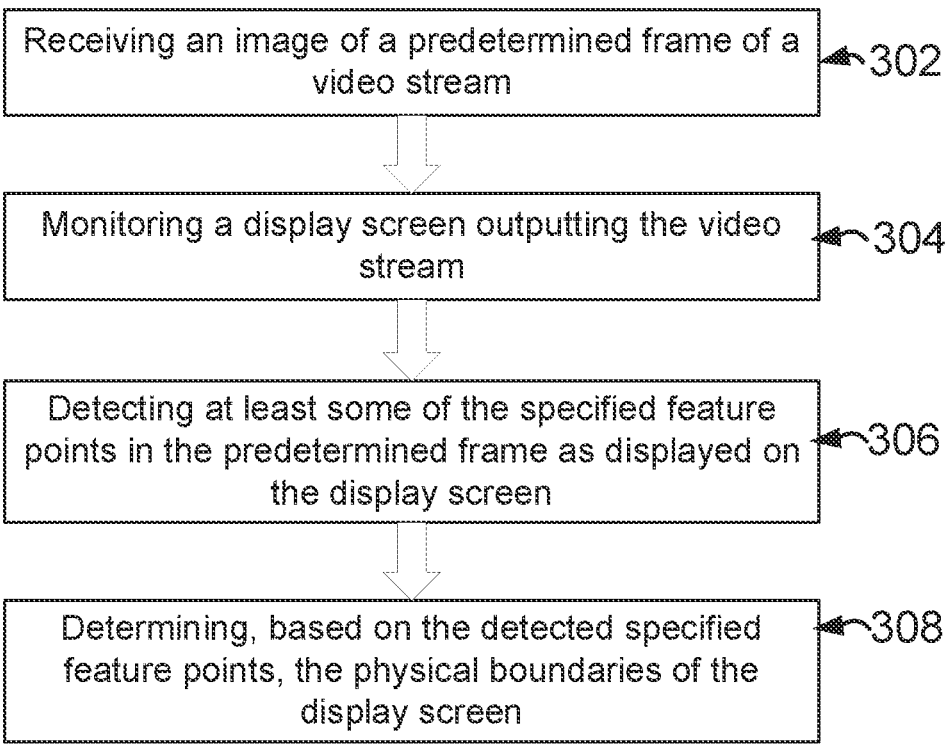
FIG. 4 shows a flowchart illustrating a computer-implemented method according to an embodiment of the present disclosure.

FIG. 4 shows a flowchart of a method of detecting a display screen according to an embodiment of the present disclosure. The method may be carried out using the extended reality display device shown in FIG. 1 or FIG. 2. It will be appreciated that it is important, in many applications, for an extended reality display device to know where the physical boundaries of a display screen are, for example in order to display virtual content at a desired location adjacent to the display screen.

At step 302 the method comprises receiving, at the extended reality display device, an image (or data defining an image) corresponding to a predetermined frame of a video stream to be displayed on a display device. The video stream may be, for example, a computer game provided from the computing device or the server as shown in FIG. 2. The image (and the predetermined frame) comprises a plurality of specified feature points. For example, each feature point may be, or form part of, a virtual object in the video stream, such as a character, or shape or other object. In some embodiments, a plurality of the specified feature points may define the shape of a virtual object in the video frame.

The predetermined frame may be selected (e.g., by the computing device or the server) because it comprises a given number (or large number) of specified feature points that should enable the extended reality display device to determine the display screen boundaries. The predetermined frame may be selected (e.g., by the computing device or the server) because it comprises a given number of specified feature points that are relatively easy to distinguish or identify (e.g., compared to a background scene or image), or a given number of specified feature points that have a well-defined shape (such as letters or numbers).

The predetermined frame may be selected (e.g., by the computing device or the server) because it will be displayed on the display screen for an amount of time that exceeds a given threshold.

Step 302 may also include receiving or retrieving data from a game data stream associated with the video stream. It will be appreciated at that a video game stream generally comprises a video stream and a game data stream. The data may comprise game state information, or additional contextual information related to the video stream.

At step 304, the method comprises monitoring the display screen that is displaying the video stream. In other words, step 304 comprises using image tracking to monitor the frames or images displayed on the display screen. Optionally, the extended reality display device may receive an estimated display time at which the predetermined frame is expected to be displayed on the display screen.

At step 306, the method comprises detecting at least some of the plurality of specified feature points in the predetermined frame of the video stream as displayed on the display screen. This may be referred to as identifying the predetermined frame of the video stream by detecting a sufficient number of the specified feature points that are in the image.

At step 308 the method comprises determining, based on the detected specified feature points, the physical boundaries of the display screen. It will be appreciated that in step 306, a sufficient number of the specified feature points must be detected in order for step 308 to be successful. Step 308 may comprise comparing the detected specified image points to the image of the predetermined frame, and thereby determining the physical boundaries of the display screen.

Step 308 may also comprise using the game data received to determine the physical boundaries of the display screen, or the orientation of the display screen. In one non-limiting example, the game data might provide information indicating that the player is in a certain area of the virtual environment (which may be associated with a colour theme and/or notable objects). This information can be used to assist the visual recognition of the predetermined frame, or to provide additional specified image points to be detected.

In another non-limiting example, the game data received may indicate that the player or user has 50% health points. Thus, the extended reality display device may know (or may receive information indicating) what that the healthbar should look like (e.g. half full red bar), and the location and orientation of the healthbar relative to the physical boundaries of the display screen (e.g. top left corner of the screen). This information can be used at step 306 to identify the location and orientation of the healthbar on the display screen. At step 308 the location and orientation of the healthbar on the display screen can be used to assist in determining the location and/or orientation of the display screen boundaries.

Figures 5A, 5B:
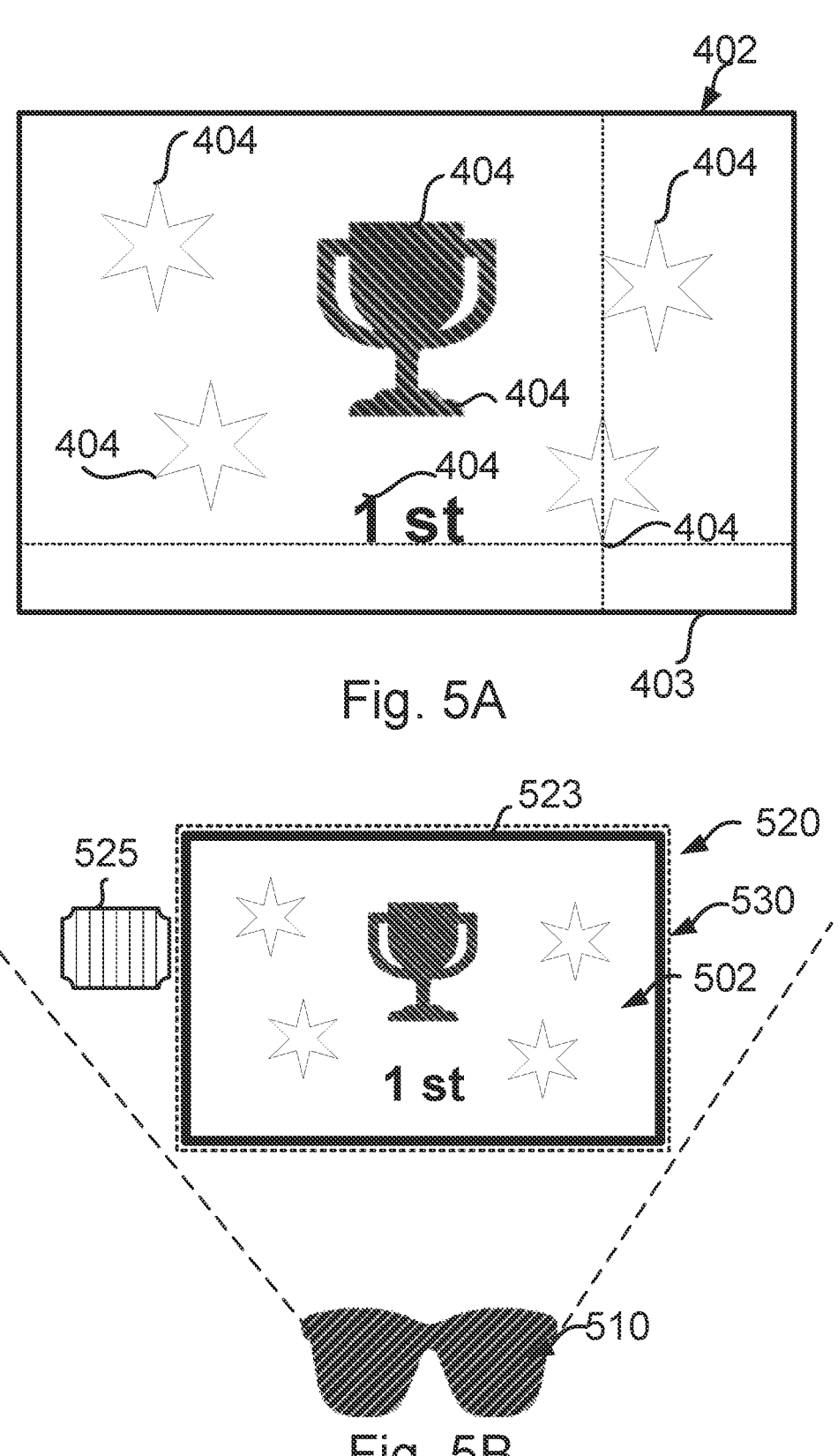
FIG. 5A shows a representation of an image of a predetermined frame of a video stream.
FIG. 5B shows a representation of the computer-implemented system and method of an embodiment of the present disclosure.

FIG. 5A shows an example of an image 402 of a predetermined frame of a video stream, wherein the video stream may be a video game. It will be appreciated that FIGS. 5A and 5B are not drawn to scale and are simplified examples of the present disclosure.

As shown in FIG. 5A, there are a plurality of specified feature points 404 in the image 402. It will be appreciated that not all of the specified feature points are labelled for simplicity. For example, each point (or tip) of each star may be a specified feature point.

It will be appreciated that the boundaries 403 of the image correspond, in practice, to the physical boundaries of the display screen, assuming that the predetermined frame is set to take up the entirety of the display screen area. In addition, the dimensions of the image will be scaled in proportion when the predetermined frame is displayed on the display screen.

As shown by the dotted lines in FIG. 5A for one of the feature points 404, each specified feature point 404 has a defined location relative to the boundaries 403 of the image and hence the physical boundaries of the display screen. In addition, each of the specified feature points has a defined location relative to the other specified feature points. Thus, this allows the physical boundaries of the display screen to be determined.

FIG. 5B shows an extended reality display device 510 monitoring a display screen 520 after receipt of the image 402 (or receipt of data defining the image 402). The display screen 520 has physical boundaries. The display screen 520 is outputting the video stream of which the image 402 is a frame 502. The extended reality (XR) display device 510 is attempting to identify the predetermined frame 502 based on the image 402 received (or the data defining the image 402 that is received). In FIG. 5B, the predetermined frame 502 is displayed on the display screen and the extended reality display device 510 should detect at least some of the specified feature points 404 from the image 402 received. As detailed above, if a sufficient number of the specified feature points 404 are detected in the display screen 520 output, then the extended reality display device 510 may determine the physical boundaries 523 of the display screen 520. This may include determining the orientation and location of the physical boundaries 523 of the display screen 520.

However, if for whatever reason the extended reality display device 510 fails to detect a sufficient number of the specified feature points 404 to allow the physical boundaries 523 of the display screen 520 to be determined, then the extended reality display device may receive a second image corresponding to a second predetermined frame of the video output. The process may be repeated for the second predetermined frame. This is shown in the flowchart in FIG. 6.

It may be desirable to determine the physical boundaries 523 of the display screen 520 so that virtual content can be displayed at a desired location relative to the physical boundaries 523 of the display screen 520. After the physical boundaries have been determined (i.e. the location, size and orientation of the physical boundaries of the display screen 520), the XR device 510 may create one or more virtual boundaries 530 aligned with or overlapping with the physical boundaries 523 of the display screen.

The virtual boundaries 530 may be fixed or anchored with respect to the physical screen 520, such that the virtual boundaries 530 will not move even if the XR device 510 moves. The virtual boundaries 530 may allow a virtual object 525 to be displayed at a specified location relative to the physical display screen 520. Optionally, the virtual object 525 may be, but is not limited to, a user interface (UI) element or a heads-up display (HUD) element, which may ideally be displayed close to an edge of the display screen 520.

Figure 6:
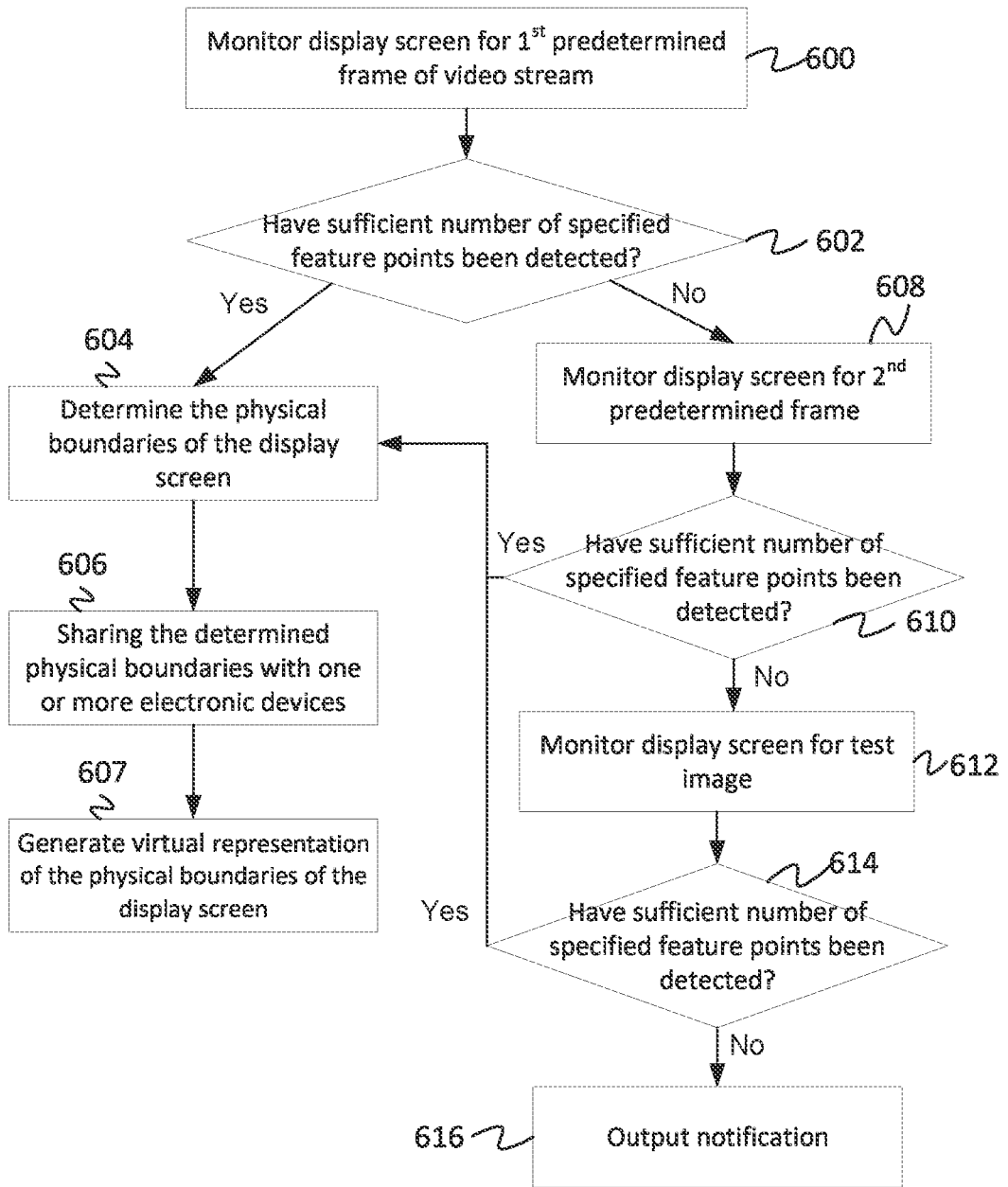
FIG. 6 shows a flowchart illustrating a computer-implemented method according to an embodiment of the present disclosure.

FIG. 6 shows a flowchart illustrating a method implemented by an extended reality display device according to an embodiment of the present disclosure. In this embodiment, prior to step 600 the extended reality display device receives the first image corresponding to a first predetermined frame of a video stream, a second image corresponding to a second predetermined frame of the video stream and a test image. The test image may correspond to a third predetermined frame of the video stream, or the test image may be an image that does not form part of the video stream, but may be displayed on the display device if needed. However, as described below, in some embodiments the images may be received periodically as the method progresses.

At step 600, the extended reality display device monitors the display device, looking for the specified feature points of the first predetermined frame (from the first image).

At step 602, the method comprises determining if a sufficient number of the plurality of specified feature points (from the first image) have been detected in the first predetermined frame to enable the physical boundaries of the display screen to be determined. Step 602 may be carried out after the first predetermined frame is known to have been displayed.

If the answer to step 602 is yes, then the method proceeds to step 604 wherein the physical boundaries of the display screen are determined. This may include determining the orientation and location of the physical boundaries of the display screen, and/or the size of the display screen. Step 604 may comprise comparing the detected specified feature points to the image of the first predetermined frame received previously.

Optionally, the method may progress to step 606 wherein the determined physical boundaries of the display screen may be shared with one or more electronic devices that are in communication with the extended reality display device via a communication network. In some embodiments, the one or more electronic devices may be connected to the extended reality display device via a wired or wireless connection.

Optionally, the method may progress to step 607 wherein a virtual representation of the determined physical boundaries of the display screen are generated. The virtual representation of the determined physical boundaries of the display screen may be referred to as the virtual boundaries of the display screen. The virtual boundaries (or virtual representation of the physical boundaries) may be anchored or fixed to the determined location of the display screen boundaries, such that the virtual boundaries do not move even if the extended reality device (or user) moves.

The virtual boundaries, or virtual representation of the determined physical boundaries of the display screen, may define (or represent) the location of the display screen in a virtual environment (or space) created by the extended reality display device 110.

The virtual boundaries, or virtual representation of the determined physical boundaries of the display screen, may define the edges of a virtual display area. Virtual content (such as virtual objects) may be displayed or presented in the virtual display area. The virtual display area may at least partially surround the display screen.

If the answer to step 602 is no, then the method proceeds to step 608 wherein the display screen is monitored to detect the second predetermined frame of the video stream. The second predetermined frame of the video stream will be displayed at a time after the first predetermined frame is displayed.

At step 610 the method comprises determining if a sufficient number of the plurality of specified feature points (from the second image) have been detected in the second predetermined frame to enable the physical boundaries of the display screen to be determined. Step 610 may be carried out after the second predetermined frame is known to have been displayed.

If the answer to step 610 is no, then in some embodiments steps 608 and 610 may be repeated for a given number of additional predetermined frames of the video stream.

However, in FIG. 6, if the answer to step 610 is no, then the method moves on to monitor the display screen for a test image (step 612). The test image may be a default final option in the event of the failure to detect sufficient specified feature points in any of the preceding predetermined frames of the video stream.

As mentioned above, the test image may correspond to a predetermined frame of the video stream, or the test image may be an image that does not form part of the video stream, but may be displayed on the display device if needed.

At step 614 the method comprises determining if a sufficient number of the plurality of specified feature points (from the test image) have been detected on the display screen to enable the physical boundaries of the display screen to be determined. If yes, then the method may proceed to step 604. If no, the method may comprise outputting a notification (step 616). The notification may be an error notification. The notification may be displayed on the extended reality display device, and/or on the display screen. Optionally, the notification may require the user to take action to attempt to resolve the issue of the failure to detect the display screen boundaries.

Accordingly, there has been described a computer-implemented method for detecting a display screen using an extended reality display device, comprising receiving, at the extended reality display device, an image corresponding to a predetermined frame of a video stream, the predetermined frame comprising a plurality of specified feature points, monitoring a display screen that is displaying the video stream, detecting at least some of the plurality of specified feature points in the predetermined frame of the video stream as displayed on the display screen, and determining, based on the detected specified feature points, the physical boundaries of the display screen.

Further embodiments or aspects of the present disclosure are described in the following numbered clauses:

1. A computer-implemented method for detecting a display screen using an extended reality display device, comprising: receiving, at the extended reality display device, an image corresponding to a predetermined frame of a video stream, the predetermined frame comprising a plurality of specified feature points; monitoring a display screen that is displaying the video stream; detecting at least some of the plurality of specified feature points in the predetermined frame of the video stream as displayed on the display screen; and determining, based on the detected specified feature points, the physical boundaries of the display screen.

2. The computer-implemented method of clause 1, further comprising: determining, based on the detected specified feature points, the orientation and location of the display screen.

3. The computer-implemented method of any preceding clause, further comprising: receiving, at the extended reality display device, information comprising the location of each specified feature point relative to at least one physical boundary of the display screen.

4. The computer-implemented method of any preceding clause, further comprising: determining, from the image, a location of each specified feature point relative to at least one physical boundary of the display screen.

5. The computer-implemented method of any preceding clause, wherein determining, based on the detected specified feature points, the physical boundaries of the display screen, comprises: comparing the detected specified feature points to the image corresponding to the predetermined frame of the video stream.

6. The computer-implemented method of any preceding clause, wherein, in response to the extended reality display device failing to detect a sufficient number of the specified feature points to enable the physical boundaries of the display screen to be detected, the method comprises outputting a notification from the extended reality display device.

7. The computer-implemented method of any preceding clause, comprising receiving, at the extended reality display device, a plurality of images, each image corresponding to one of a plurality of predetermined frames of the video stream, each predetermined frame comprising a respective plurality of specified feature points.

8. The computer-implemented method of clause 7, wherein in response to the extended reality display device failing to detect a sufficient number of the specified feature points in a first one of the plurality of predetermined frames to enable the physical boundaries of the display screen to be determined, the method comprises receiving a second image corresponding to a second predetermined frame of the video stream.

9. The computer-implemented method of clause 8, comprising: detecting at least some of the plurality of specified feature points in the second predetermined frame of the video stream as displayed on the display screen; and determining, based on the detected specified feature points of the second predetermined frame, the physical boundaries of the display screen.

10. The computer-implemented method of any preceding clause, wherein in response to the extended reality display device failing to determine the physical boundaries of the display screen, the method comprises: receiving at the extended reality display device a test image, the test image comprising a plurality of specified feature points; detecting at least some of the plurality of specified feature points in the test image as displayed on the display screen; and determining, based on the detected specified feature points in the test image, the physical boundaries of the display screen.

11. The computer-implemented method of any preceding clause, wherein the video stream is a video game or a computer game.

12. The computer-implemented method of any preceding clause, further comprising: providing the determined physical boundaries of the display screen to one or more electronic devices operably connected to the extended reality display device via a communication network.

13. The computer-implemented method of any preceding clause, wherein the extended reality display device and the display screen are in communication with a plurality of electronic devices via a communication network, the method further comprising the initial step of: communicating with the plurality of electronic devices to determine if the physical boundaries of the display screen are known by any of the plurality of electronic devices; and in response to determining that the physical boundaries of the display screen are not known by any of the plurality of electronic devices, the method continues according to any of the preceding claims.

14. The computer-implemented method of any preceding clause, further comprising: generating one or more virtual boundaries aligned with or overlapping with the determined physical boundaries of the display screen.

15. The computer-implemented method of clause 14, wherein: the one or more virtual boundaries are fixed relative to the respective physical boundaries of the display screen; and/or the one or more virtual boundaries provide a virtual representation of the physical boundaries of the display screen within a virtual environment created by the extended reality display device.

16. An extended reality display device comprising: a processor; and memory, the memory including executable instructions that, as a result of execution by the processor, causes the extended reality display device to perform the computer-implemented method of any preceding claim.

17. The extended reality display device of clause 16, wherein the extended reality display device is an augmented reality, AR, headset.

18. A system comprising: a display screen; a computing device; and an extended reality display device according to clause 16 or clause 17, wherein the display screen, the computing device and the extended reality display device are operably connected by a communication network.

It is to be understood that the above description is intended to be illustrative, and not restrictive. Many other implementations will be apparent to those of skill in the art upon reading and understanding the above description. Although the disclosure has been described with reference to specific example implementations, it will be recognised that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method for detecting a display screen using an extended reality display device, comprising:

receiving, at the extended reality display device, an image corresponding to a predetermined frame of a video stream, the predetermined frame comprising a plurality of specified feature points;

receiving, at the extended reality display device, data from a game data stream associated with the video stream;

monitoring a display screen that is displaying the video stream;

detecting, using image tracking, at least some of the plurality of specified feature points in the predetermined frame of the video stream as displayed on the display screen; and determining, based on the data received from the game data stream and a known location of each detected specified feature points relative to at least one physical boundary of the display screen, the physical boundaries of the display screen.

2. The computer-implemented method of claim 1, further comprising:

determining, based on the detected specified feature points, an orientation and a location of the display screen.

3. The computer-implemented method of claim 1, wherein determining, based on the detected specified feature points, the physical boundaries of the display screen, comprises:

comparing the detected specified feature points to the image corresponding to the predetermined frame of the video stream.

4. The computer-implemented method of claim 1, wherein, in response to the extended reality display device failing to detect a sufficient number of the specified feature points to enable the physical boundaries of the display screen to be detected, the method comprises outputting a notification from the extended reality display device.

5. The computer-implemented method of claim 1, comprising receiving, at the extended reality display device, a plurality of images, each image corresponding to one of a plurality of predetermined frames of the video stream, each predetermined frame comprising a respective plurality of specified feature points.

6. The computer-implemented method of claim 5, wherein in response to the extended reality display device failing to detect a sufficient number of the specified feature points in a first one of the plurality of predetermined frames to enable the physical boundaries of the display screen to be determined, the method comprises receiving a second image corresponding to a second predetermined frame of the video stream.

7. The computer-implemented method of claim 6, comprising:

detecting at least some of the plurality of specified feature points in the second predetermined frame of the video stream as displayed on the display screen; and determining, based on the detected specified feature points of the second predetermined frame, the physical boundaries of the display screen.

8. The computer-implemented method of claim 1, wherein in response to the extended reality display device failing to determine the physical boundaries of the display screen, the method comprises:

receiving at the extended reality display device a test image, the test image comprising a plurality of specified feature points;

detecting at least some of the plurality of specified feature points in the test image as displayed on the display screen; and determining, based on the detected specified feature points in the test image, the physical boundaries of the display screen.

9. The computer-implemented method of claim 1, wherein the video stream is a video game or a computer game.

10. The computer-implemented method of claim 1, further comprising:

providing the determined physical boundaries of the display screen to one or more electronic devices operably connected to the extended reality display device via a communication network.

11. The computer-implemented method of claim 1, wherein the extended reality display device and the display screen are in communication with a plurality of electronic devices via a communication network, the method further comprising:

communicating with the plurality of electronic devices to determine if the physical boundaries of the display screen are known by any of the plurality of electronic devices.

12. The computer-implemented method of claim 1, further comprising:

generating one or more virtual boundaries aligned with or overlapping with the determined physical boundaries of the display screen.

13. The computer-implemented method of claim 12, wherein:

the one or more virtual boundaries are fixed relative to the respective physical boundaries of the display screen; and/or the one or more virtual boundaries provide a virtual representation of the physical boundaries of the display screen within a virtual environment created by the extended reality display device.

14. A device comprising:

a display;

a processor; and a memory including executable instructions that, as a result of execution by the processor, causes the device to:

receive, at the device, an image corresponding to a predetermined frame of a video stream, the predetermined frame comprising a plurality of specified feature points;

receive, at the device, data from a game data stream associated with the video stream;

monitor the display that is displaying the video stream;

detect, using image tracking, at least some of the plurality of specified feature points in the predetermined frame of the video stream as displayed on the display; and determine, based on the data received from the game data stream and a known location of each detected specified feature points relative to at least one physical boundary of the display, the physical boundaries of the display.

15. The device of claim 14, wherein the device is an augmented reality, AR, headset.

16. A system comprising:

a display screen;

a computing device; and an extended reality display device, wherein the display screen, the computing device and the extended reality display device are operably connected by a communication network, and wherein the extended reality display device comprises:

a processor; and a memory including executable instructions that, as a result of execution by the processor, causes the extended reality display device:

receive, at the extended reality display device, an image corresponding to a predetermined frame of a video stream, the predetermined frame comprising a plurality of specified feature points;

receive, at the extended reality display device, data from a game data stream associated with the video stream;

monitor a display screen that is displaying the video stream;

detect, using image tracking, at least some of the plurality of specified feature points in the predetermined frame of the video stream as displayed on the display screen; and determine, based on the data received from the game data stream and a known location of each detected specified feature points relative to at least one physical boundary of the display screen, the physical boundaries of the display screen.

* * * * *